United States Patent [19]

Brunsell et al.

[11] Patent Number: 4,936,990

[45] Date of Patent: Jun. 26, 1990

[54] APPARATUS FOR MULTIPLE FLUID PHASE SEPARATOR

[76] Inventors: Dennis A. Brunsell, 705 Main St., Arlington, Wis. 53911; John M. Ehle, 5006 Voges Rd., Madison, Wis. 53704

[21] Appl. No.: 345,949

[22] Filed: May 1, 1989

[51] Int. Cl.⁵ .............................................. B01D 33/26
[52] U.S. Cl. ................................. 210/331; 210/333.1; 210/347; 210/360.1
[58] Field of Search ............... 55/204, 459.1; 209/144, 209/211; 210/324, 331, 333.1, 360.1, 360.2, 380.1, 347

[56] References Cited

U.S. PATENT DOCUMENTS

| 3,997,447 | 12/1976 | Breton et al. | 210/360.1 |
| 4,698,156 | 10/1987 | Bumpers | 210/331 |
| 4,717,485 | 1/1988 | Brunsell et al. | 210/781 |

Primary Examiner—Charles Hart
Attorney, Agent, or Firm—Lathrop & Clark

[57] ABSTRACT

An apparatus for multiple fluid phase separation (10) includes a housing (12) having a second chamber (21) positioned above a first chamber (19). A plurality of filter disks (22) are mounted upon a rotatable vertical shaft assembly (24) in spaced stacked relation within the first chamber (19). The shaft assembly (24) includes a first interior channel (30) and a second interior channel (32). A bulk solution including two immiscible phases is introducted, under pressure, into the first chamber (19) through an entry pipe (33). The heavier phase is filtrated through the disks (22), enters the first interior channel (30), and is channelled to an exit port (32). Bulk solution having a reduced proportion of heavier fluid phase flows through radial openings (96) in the shaft assembly (24) located between the disks (22) into the second interior channel (32) and up into the second chamber (21). An interface is formed in the second chamber (21) between the lighter fluid phase and the remaining heavier phase by coalescence. The heavier phase migrates back to the first chamber (19) and the lighter phase exits the system at an outlet (36) in the second chamber (21).

51 Claims, 11 Drawing Sheets

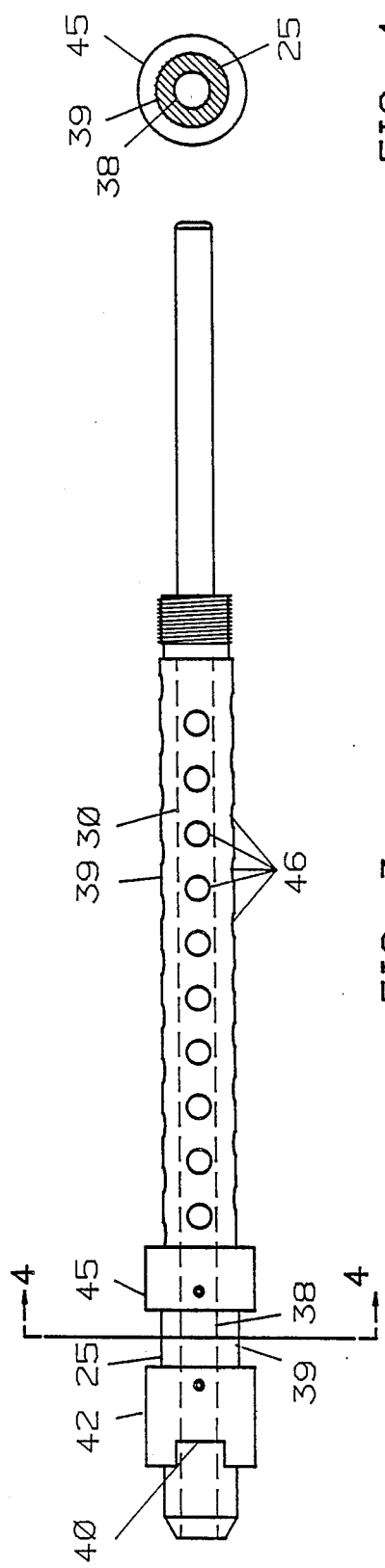

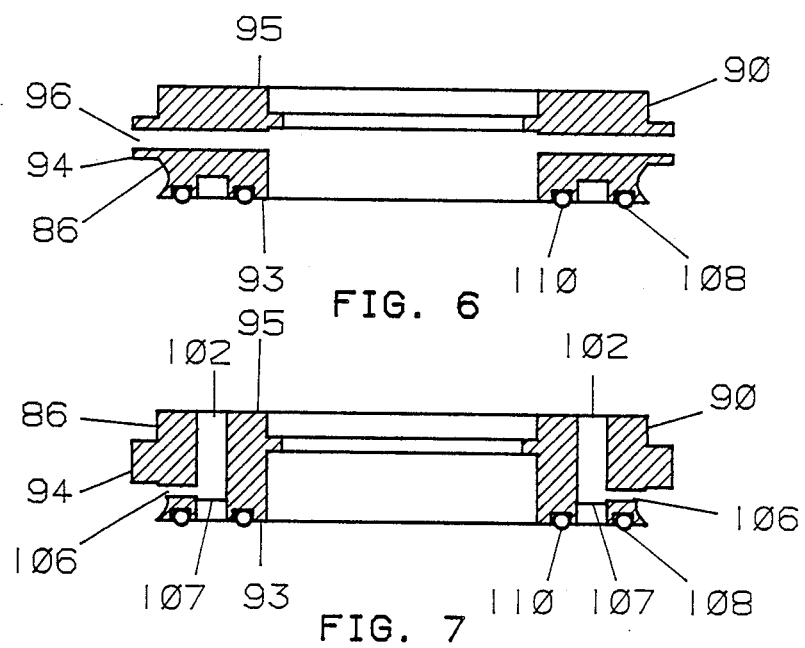
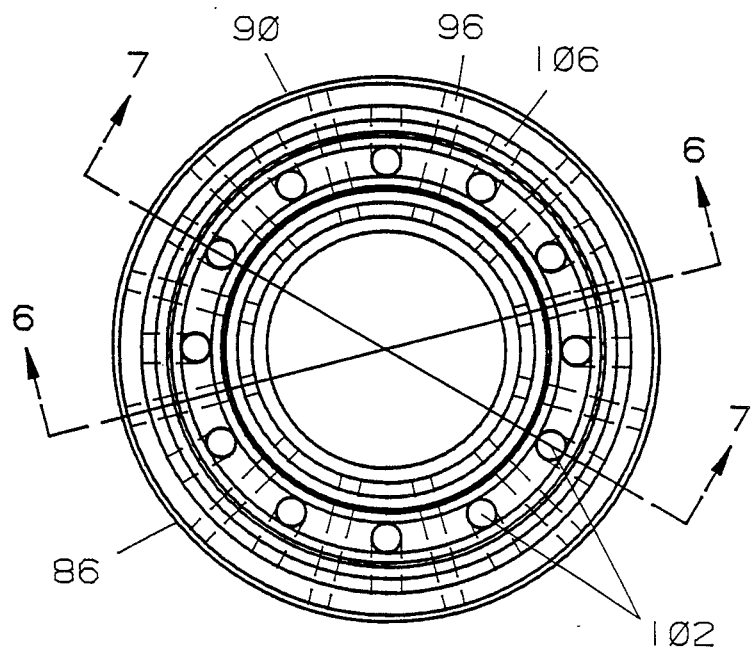
FIG. 5

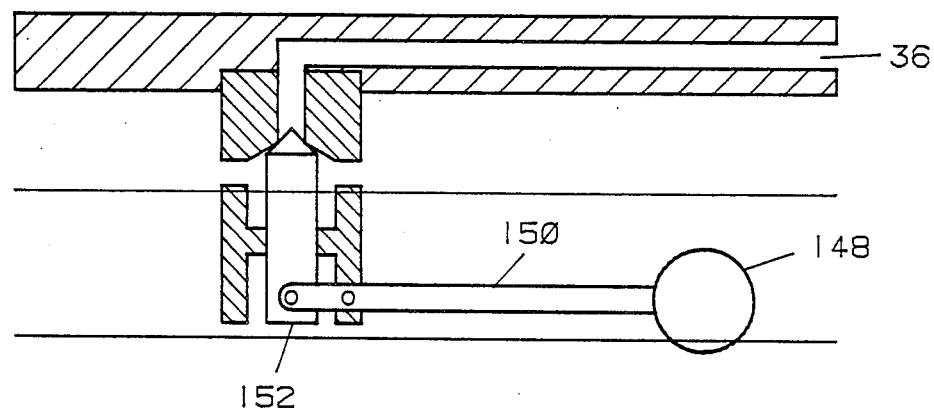
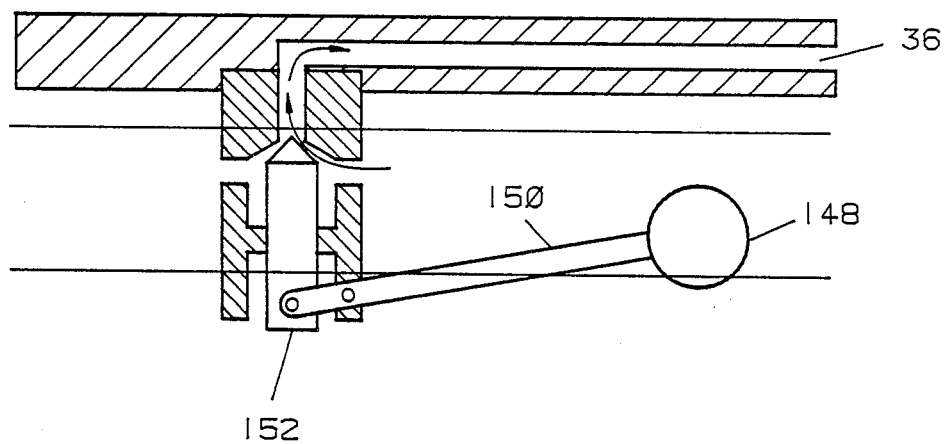
FIG. 16

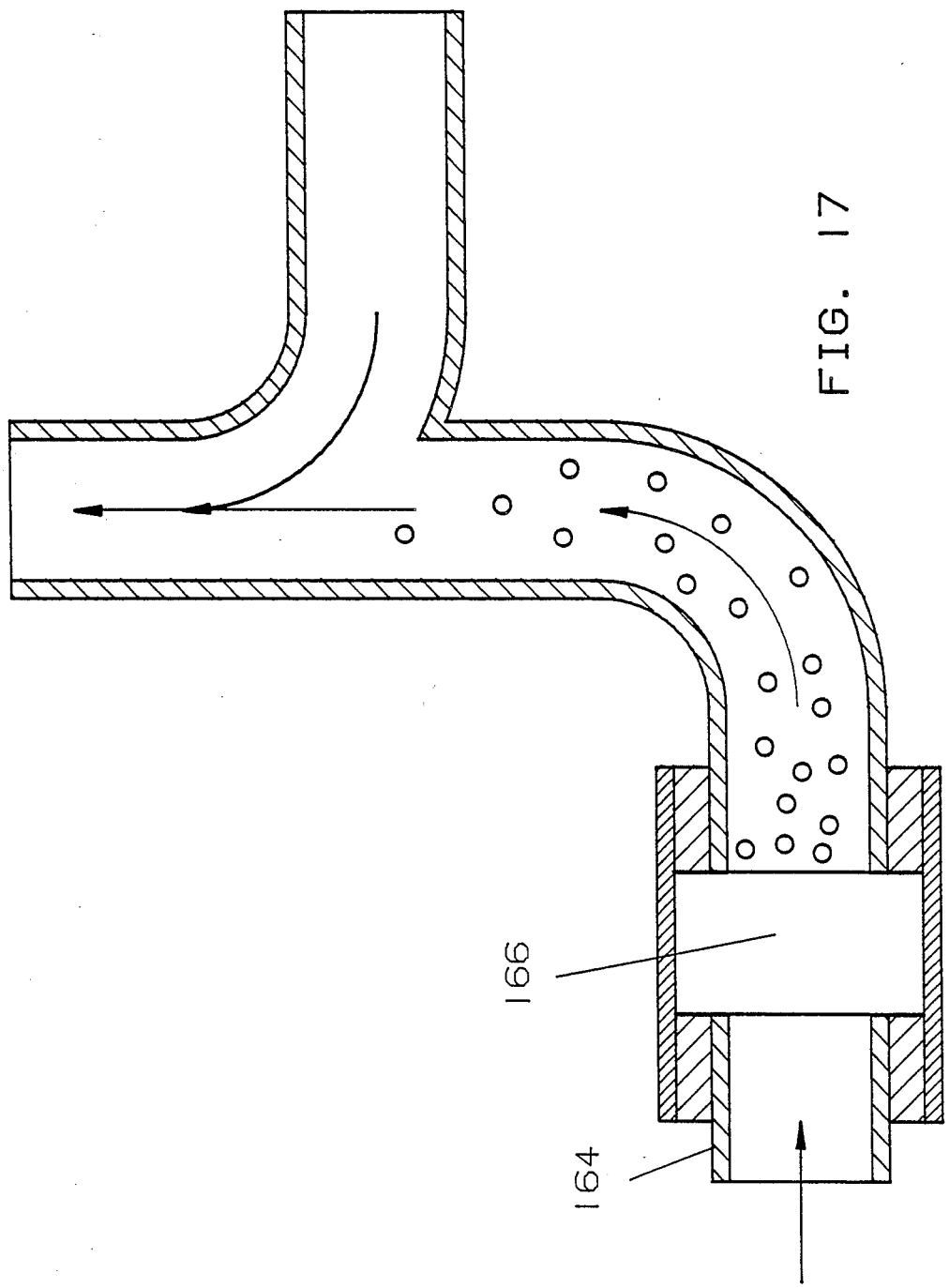

APPARATUS FOR MULTIPLE FLUID PHASE SEPARATOR

FIELD OF THE INVENTION

The present invention relates to oil/water separation apparatuses and more particularly to centrifugal disk separation apparatuses applied to the separation of finely dispersed immiscible phases from each other.

BACKGROUND OF THE INVENTION

Equipment for separation of multiple fluid phases has, in the past, utilized one of four principles for the separation of the constituent elements of an emulsion: (a) natural coalescence of the phases in a large, quiet vessel; (b) coalescence by the use of a large surface area, for example, inclined plate, wire mesh, plastic media, etc. (c) air flotation, which uses a large vertical column in which the dissolved air in a high pressure water stream is injected into a stream of multiple fluid phases near the lower end of the column and the effervescent bubbles carry the oil to the surface; and (d) application of centrifugal force using such equipment as high speed centrifuges and hydrocyclones.

The aforementioned methods of fluid phase separation have had varying degrees of success in effecting a complete separation of the two phases from the emulsion. Some of the methods are successful, if, for example, they are given enough time or surface area. All of the apparatuses that apply the above methods have at least one or more of the following disadvantages: a failure to produce a low enough concentration of oil in the processed water; a bulky size, large footprint, or excessive weight; a limitation on the effective oil droplet size removal from the water; and easy fouling of the equipment by particulates, asphalts, paraffins, etc.; an inability to tolerate the use of centrifugal pumps to move the emulsion; and an inability to tolerate large fluctuations in the feed supply.

Those apparatuses of the prior art that employ natural coalescence use either open or closed vessels with baffles to inhibit mixing and turbulence, and require long residence times (hours, days, or even months) or chemical additions to promote complete separation of the fluid phases. The cost of tankage or chemicals may be cost prohibitive.

The use of certain surfaces have been found to enhance coalescence of oil/water emulsions. Such surfaces are made from materials which attract the noncontinuous phase preferentially. Large surface area plates, meshes, and packing materials have been incorporated into coalescence vessels to decrease volume and residence times, the effectiveness being in direct proportion to the size of the droplets as compared to the probability of the noncontinuous phase contacting one of the surfaces. By this method of coalescence, the presence of extremely small droplets of a finely dispersed immiscible phase results in significantly higher effluent levels.

Air flotation is an alternate method for generating large surface areas on which the oil may coalesce and be floated to the top of a vessel. In order for air flotation to be effective, a gas must be dissolved into the continuous phase liquid at elevated pressure and then released to form the tiny bubbles at an even distribution throughout the liquid. This usually requires recycling some of the continuous phase back to the beginning of the separation process. If the noncontinuous phase becomes too concentrated, the recycle stream becomes excessive. For the case of air flotation, very fine emulsions or very low surface tension organics may not be effectively separated. In practice, the equipment loses efficiency very quickly and must be cleaned frequently.

Centrifugal separators utilize the density difference between liquid phases to enhance separation. A high speed centrifuge will magnify this density difference with increased rpm's. Separation of an oil/water emulsion is effective as long as the droplet size is sufficient to overcome the Brownian motion forces, which tend to suspend and circulate the droplets, preventing the droplets from coalescing. Hydrocyclones use similar principles except that the rotational motion is imparted by tangential inlet rather than vessel rotation. In both cases, the light phase is removed at the center and the heavy phase at the periphery of the vessel. The centrifuges often have nonporous disks rotating in the vessel to promote the separation through increased surface area.

Centrifugal disk filters such as are disclosed in U.S. Pat. Nos. 3,997,447 and 4,698,156 issued to Breton et al. and Bumpers, respectively, have typically used rapidly rotating filter elements with axial removal of filtrate and containment within a pressure vessel in which a suspension of solid particles are injected to effect separation. Such disk filters are not suitable as designed to continuous separation and removal of the two phases. The lighter phase in the Breton et al. or Bumpers design tends to accumulate near the shaft and either blind the surface or bleed through the disks into the filtrate stream.

SUMMARY OF THE INVENTION

In accordance with the present invention, an apparatus for multiple fluid phase separation has a plurality of filter disks mounted upon a hollow rotatable vertical shaft assembly in stacked spaced relation within a first chamber. The shaft assembly has a first interior channel and a second interior channel. Bulk solution including two immiscible fluid phases, a heavier fluid phase and a lighter fluid phase, is introduced, under pressure, into the first chamber. The heavier phase is filtrated through the disks, enters the first interior channel, and is channelled to an exit port. Bulk solution having a reduced proportion of heavier fluid phase enters into openings in the shaft assembly located between the disks, enters the second interior channel, and is directed to a second chamber positioned above the first chamber. A centrifugal pump assists in drawing the solution from the second interior channel into the second chamber. An interface is formed in the second chamber between the lighter fluid phase and the remaining heavier phase by coalescence. The heavier phase migrates back to the first chamber and the lighter phase leaves the system at an outlet in the second chamber.

The apparatus of the present invention has a reduced size and weight compared to the separators of the prior art. The present invention does not require large volume tanks or surface areas, thereby resulting in significant space and cost-savings. No chemicals are needed to assist in the separation of the multiple phases, and separation is continuous and does not require lengthy residence times.

Fouling of the disks by particulates within the bulk solution may be prevented by the use of a backpulse through the disks, which will discharge the particulates back into the bulk solution. The use of the backpulse also releases the lighter phase from the surface of the disk to permit a more rapid separation. Cleaning of the present invention is not therefore needed as frequently as, for example, air flotation systems.

The present invention is unaffected by large fluctuations in the feed supply or to centrifugal pumps that are used to move the bulk solution inasmuch as the first chamber is insensitive to turbulence that might otherwise hinder coalescence.

Where the effectiveness of the prior art is linked to the probability of the noncontinuous phase contacting a surface that is used to induce coalescence, in the present invention all of the processed fluid has passed through the disks and has been filtrated. Thus the present invention is capable of producing a lower concentration of oil in the processed fluid and a smaller droplet size that is removed from the bulk solution.

Further objects, features, and advantages of the invention will be apparent from the following detailed description when taken in conjunction with the accompanying drawings.

BRIEF DESCRIPTION OF THE DRAWINGS

In the drawings:

FIG. 3 is a side view of the shaft of the present invention with the female portion of the coupling attached.

FIG. 4 is a cross-section of the shaft taken along line 4—4 of FIG. 3.

FIG. 5 is a horizontal cross-section of a hub of the present invention.

FIG. 6 is a vertical cross-section of the hub taken along line 6—6 of FIG. 5.

FIG. 7 is a vertical cross-section of the hub taken along line 7—7 of FIG. 5.

FIG. 16 is a cross-section of the tapered section showing a detail of the oil float of the present invention.

FIG. 17 shows an air flotation injection system which may be incorporated in the apparatus for multiple fluid phase separation of the present invention.

DESCRIPTION OF THE PREFERRED EMBODIMENT

Figure 1:
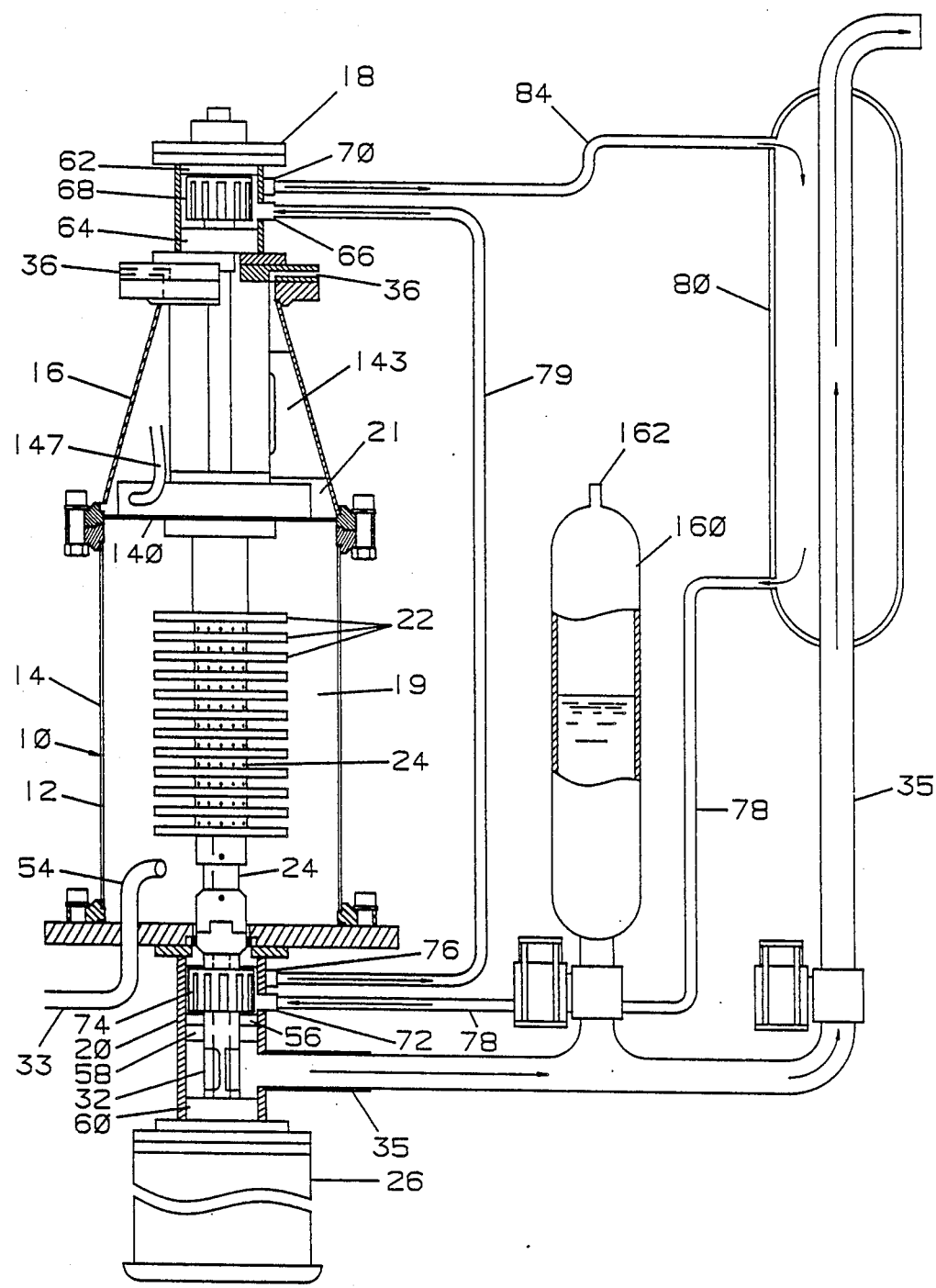
FIG. 1 is a partial cross-section of the apparatus for multiple fluid phase separation of the present invention and associated parts and piping.
Figure 2:
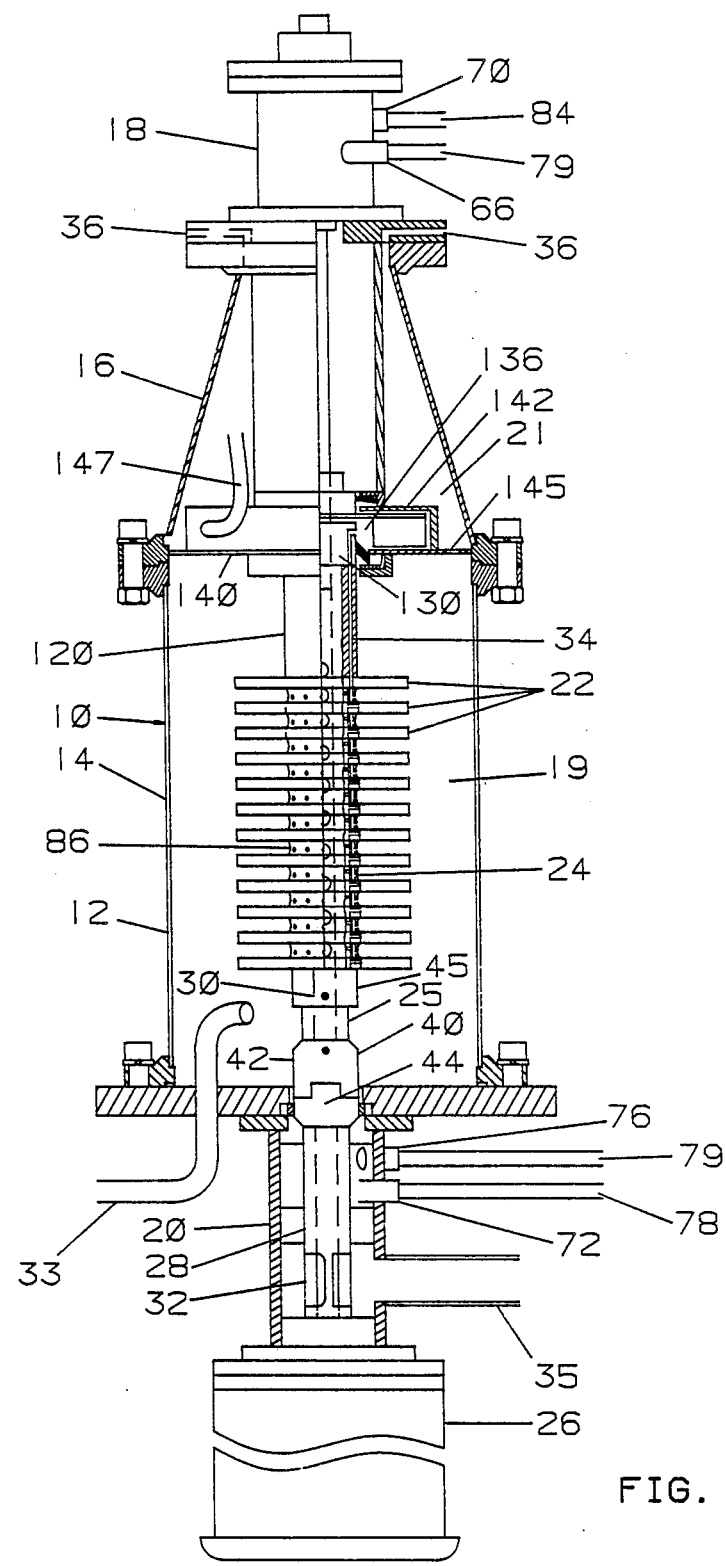
FIG. 2 is a partial cross-section of the apparatus for multiple fluid phase separation.

With reference to the drawings, the apparatus for multiple fluid phase separation of the present invention is shown generally at 10 in FIGS. 1 and 2 and may be used to separate multiple phases of liquids. The multiple fluid phases include at least two immiscible phases, a lighter phase and a heavier phase. The unseparated combination of the immiscible phases is herein referred to as the bulk solution. The separator 10 comprises a housing 12 that includes a filter barrel 14, a tapered section 16 and seal assemblies 18 and 20. A first pressure vessel or chamber 19 is formed within the boundaries of the first barrel 14 and a second chamber 21 is formed with the boundaries of the tapered section 16. A plurality of filter disks 22 are mounted upon a hollow, rotatable vertical shaft assembly 24 in spaced stacked relation within the first chamber 19. The shaft assembly 24 extends through the seal assembly 18, the tapered section 16, the filter barrel 14, and the seal assembly 20. The shaft assembly 24 includes a hollow shaft 25 and a hollow shaft 28. A motor 26 is attached to the shaft 28 which is in vertical alignment with, and coupled to, the shaft 25. The shaft 28 is mounted for rotation at the seal assembly 20, and the shaft 25 is mounted for rotation at the seal assembly 18, so that the disks 22 are capable of rotation within the filter barrel 14. Upon energizing of the motor 26, the motor 26 causes rotation of the shafts 25 and 28, and the disks 22. The hollow of the shafts 25 and 28 forms a first interior channel 30 that is axially oriented and that is in fluid communication with an exit port 32 located near the end of the shaft 28 in the lower seal assembly 20. Fluid flow in the apparatus of the present invention is as follows. Upon introduction of the bulk solution into the first chamber 19 by a pipe 33, the heavier fluid phase permeates and is filtrated through the disks 22, enters the first interior channel 30 by a route described in greater detail below, and flows down the first interior channel 30 to the exit port 32. The heavier fluid phase then leaves the apparatus 10 of the present invention through a pipe 35. A second set of interior channels 34 are formed about the shaft assembly 24 and are also axially oriented. Bulk solution having a reduced proportion of heavier fluid phase (because of that portion of heavier fluid phase permeating the disks 22) flows up the second set of interior channels 34 to the tapered section 16, where additional phase separation occurs in a manner discussed below, and the lighter fluid phase exits the separator 10 at an outlet 36.

The shaft 25 is depicted in FIGS. 3 and 4 and has an axial bore 38 and a circumferential outside edge 39. The axial bore 38 of the shaft 25 and the hollow of the shaft 28 form the first interior channel 30. A female portion 40 of a coupling 42 is attached to one end of the shaft 25. The female portion 40 of the coupling 42 mates with a male portion 44 on the shaft 28. The coupling 42 functions as the mechanism for the alignment of the shaft 25 at one end, transmits the power from the shaft 28, seals bulk solution in the first chamber 19 from the filtrated heavier phase that flows through the first interior channel 30, and permits easy assembly and disassembly of the shaft 25 from the unit for replacement of the disks 22. A collar 45 is attached to shaft 25 at a location above the female portion 40 of the coupling 42. The female portion 40 of the coupling 42 and the collar 45 can be attached to the shaft 25 by a number of different mechanisms, such as welding, set screws, pins, or press-heat fit. The portion of the shaft 25 extending through the first chamber 19 that is above the collar 45 has a plurality of apertures 46 communicating with the first interior channel 30 of the shaft 25, the apertures 46 being spaced in an even pattern around the circumference of the shaft 25. Fluid communication is thus allowed between the axial bore 38 and the circumferential outside edge 39 through the apertures 46.

The lower seal assembly 20 is fluid-transmitting, i.e. is able to transmit the filtrated fluid through the rotating shaft assembly 24 at the exit port 32 to the pipe 35. The lower seal assembly 20 comprises an upper static seal carrier 54, a lower static seal carrier 56, an upper bearing carrier 58, a lower bearing carrier 60, and other associated parts (not shown) upon which the shaft is properly aligned, balanced, and centered. The upper seal assembly 18 is non-fluid transmitting and comprises a bearing carrier 62 and a static seal carrier 64, and other associated parts (not shown). A coolant is circulated within the upper and lower seal assemblies 18 and 20 to prevent overheating of the seals and bearings caused by the rotation of the shafts 24 and 28. Coolant enters the upper seal assembly 18 at a seal coolant inlet 66 and is pumped through the upper seal assembly 18 by a turbine 68 and exits at a seal coolant outlet 70. The sealed coolant inlet 66 and outlet 70 are preferably tangentially positioned to improve the pumping characteristics of the turbine 68. Coolant enters the lower seal assembly 20 at a seal coolant inlet 72 and is pumped through the lower seal assembly 20 by a turbine 74 and exits at a seal coolant outlet 76. The seal coolant inlet 72 and the seal coolant outlet 76 are preferably tangentially positioned to improve the pumping characteristics of the turbine 74. The seal coolant system is best depicted in FIG. 1. Seal coolant is directed through a pipe 78 to the seal coolant inlet 72 and the lower seal assembly 20 from a heat exchanger 80. The seal coolant is pumped via the turbine 74 and flows the lower seal assembly 20. The coolant then is discharged through the seal coolant outlet 76 and is routed through a pipe 79 through the seal coolant inlet 66 to provide a coolant supply to the upper seal assembly 18. The seal coolant is pumped via the turbine 68 and flows through the upper seal assembly 18. Warm coolant is then returned to the heat exchanger 80 through a pipe 84 to form a complete loop. When the filtrate temperature is low enough, as is depicted in FIG. 1, the filtrate as is carried in the pipe 35 may be utilized to remove the excess heat through a counter current heat exchange. Cooling may, however, be accomplished by a number of other methods, such as use of the bulk solution to remove the excess heat or by other means which may require additional energy consumption or water usage. A more detailed explanation of the preferred arrangement of seals and bearings, and of the coolant system, may be found in co-pending U.S. application Ser. No. 07/303,534 filed on Jan. 27, 1989. The shaft assembly 25 comprises hubs 86 that are positioned about the shaft 25 in stacked relation above the collar 45.

Cross-sectional views of one of the hubs 86 are represented in FIGS. 5, 6, and 7. Each of the hubs 86 has an outer margin 90, a circular interior bore 92, and two sides 93 and 95. Each of the hubs 86 have a protruding rim 94 on the outer margin 90 upon which one of the disks 22 is mounted. The hub 86 has first radial holes 96 between the rim 94 and the interior bore 92. Fluid communication between the outer margin 90 and the interior bore 92 is thus created through the first radial holes 96. The filter disks 22 are selected so as to clarify the heavier phase so that the heavier phase may permeate the disks 22 and flow through the radial holes 96 to the interior bore 92. A lip 98 extends inwardly from the interior bore 92; upon mounting of the hubs 86 upon the shaft 25, the lip 98 abuts against the circumferential outside edge 39 of the shaft 25. A gap is thus created between the interior bore 92 of the hub 86 and the circumferential outside edge 39 of the shaft 25, such gap serving as a raceway to allow the heavier phase fluid to communicate between the radial holes 96 of the hub 86 to the openings 46 in the shaft 25 and then continue down the first interior channel 30 to the exit port 32. The first radial holes 96, the raceway created in the gap between the interior bore 92 of the hubs 86 and the circumferential outside edge 39 of the shaft 25, and the apertures 46 in the shaft 25 together comprise openings along the length of the shaft assembly 24 that are in fluid communication with the first interior channel 30.

The hubs 86 have axial holes 102 that are oriented axially and located between the outer margin 90 and the interior bore 92, and extending between the two sides 93 and 95. Fluid communication between the two sides 93 and 95 is thus created through the axial holes 102. The hub 86 has second radial holes 106 that correspond with and lead to the axial holes 102 of the hubs 86. Fluid communication between the outer margin 90 and the axial holes 102 is thus created through the second radial holes 106. When the disks 22 are mounted upon the hubs 86 and the hubs 86 are mounted upon the shaft 25, the second radial holes 106 are located between the disks 22. The region of the outer margin 86 in which the second radial holes 106 are located is concave in shape such that the radial holes 106 are located in the deepest portion of the concave shape. The number and size of the radial holes 106 can be varied according to the relative flow rates of the phases being separated. The concave shape promotes the flow of the lighter phase away from the surfaces of the disk 22. The side 93 of the hub 86 has a circumferential notch 107 that intersects with the axial holes 102. Thus, when the hubs 86 are in stacked relation upon the shaft 25, the circumferential notch 107 acts as a raceway that allows communication between the axial holes 102 of the different hubs 86. Alternately, the circumferential notch 107 may be eliminated, though in the alternate case the hubs 86 must be positioned about the shaft 25 such that the axial holes 102 are in perfect alignment. The mating surfaces of adjacent hubs are sealed by sealing O-rings 108 and 110 to prevent gross leakage of the bulk solution into the axial holes 102, and to prevent filtrate contained in the first interior channel 30 from contaminating the fluid in the axial holes 102, and vice versa.

A possible alternate embodiment of the hub 86 is to form the hub 86 in two separate units. The first unit includes the first radial holes 96 and the axial holes 102 and has one of the filter disks 22 mounted thereon. The second unit includes the axial holes 102 and the second radial holes 106 and is concave in shape. The first and second hub units are again in stacked relation about the shaft 25 above the collar 45. The first and second hub units are stacked alternately, the second unit acting as a spacer between the disks 22.

Figure 8:
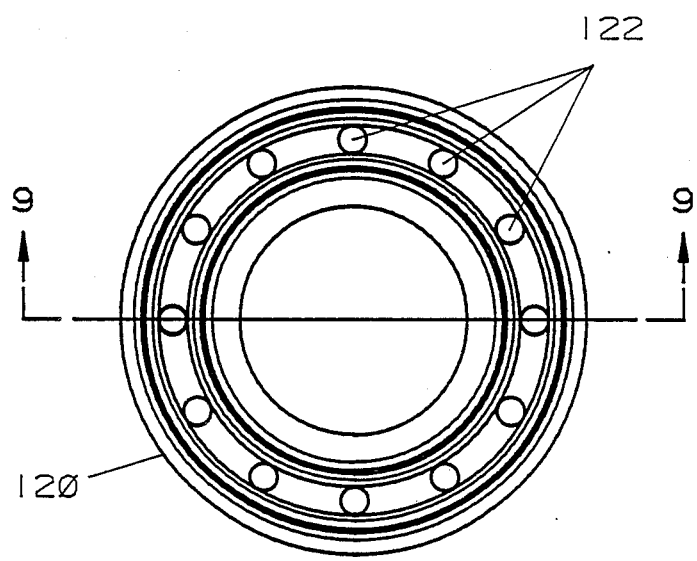
FIG. 8 is an end view of the oil sleeve of the present invention.
Figure 9:
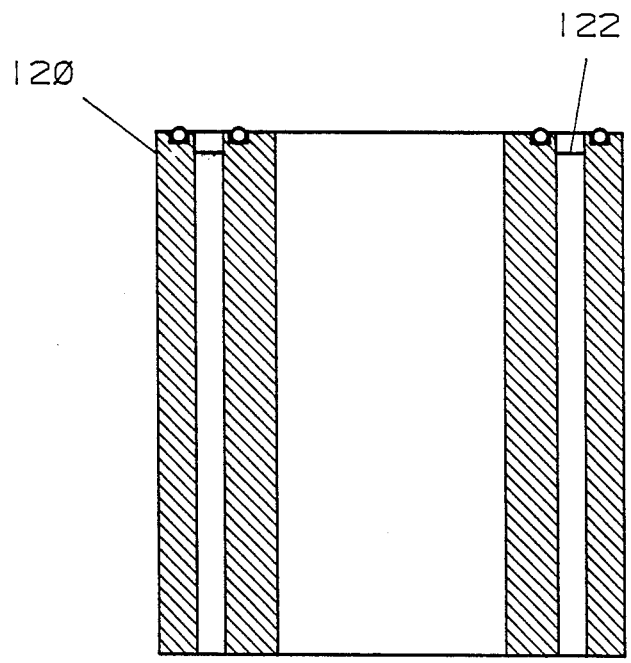
FIG. 9 is a vertical cross-section of the oil sleeve.

FIGS. 8 and 9 show a sleeve 120. The sleeve 120 is slid over the shaft 24 in a region where there are no disks 22 mounted thereupon and is impervious to fluid in the first chamber 19. The sleeve 120 has axial holes 122 that are in fluid communication with the axial holes 102 of the hubs 86.

Figure 10:
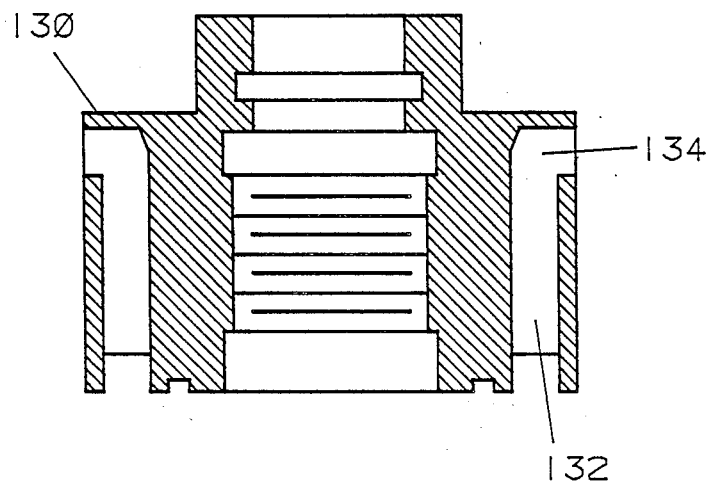
FIG. 10 is a vertical cross-section of a lock collar of the present invention.
Figure 11:
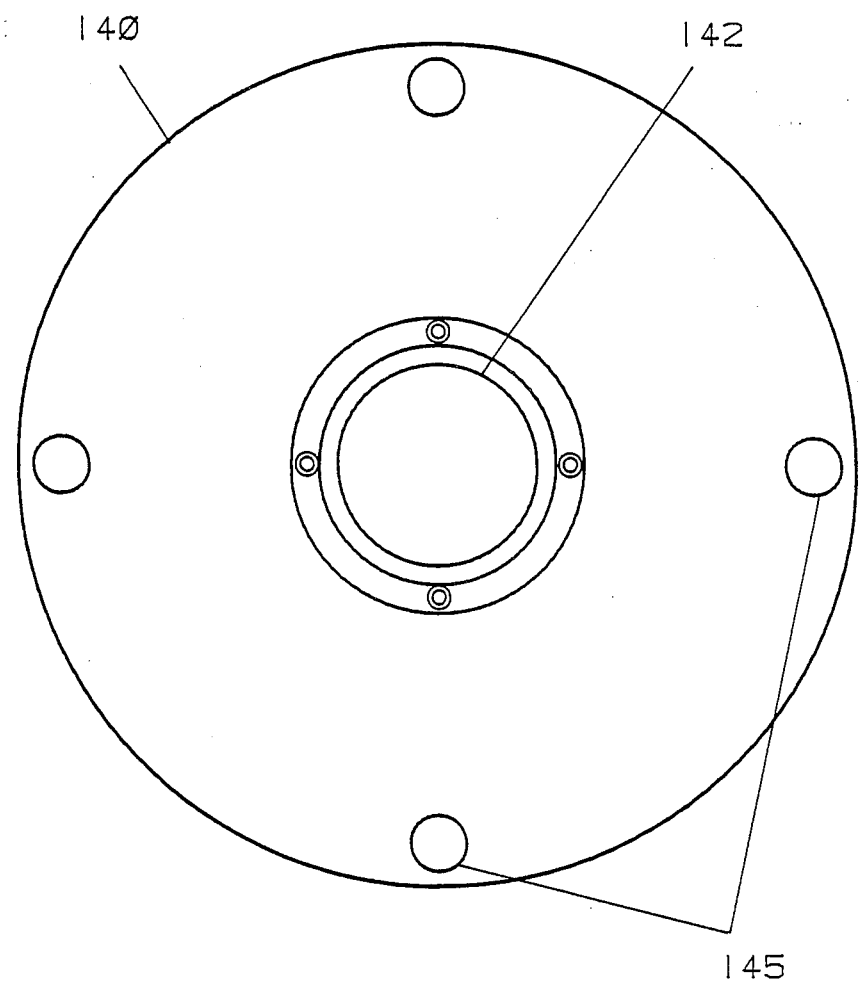
FIG. 11 is a top view of the horizontal baffle of the present invention.

The shaft 25 is threadedly engaged with a lock collar 130, shown in FIG. 10. The lock collar 130 has axial holes 132 that are in fluid communication with the axial holes 122 of the sleeve 120 and the axial holes 102 of the hubs 86. Together, the axial holes 102, 122, and 132 form the second set of interior channels 34. The lock collar 130 rotates with the shaft 25. Fluid transmitted through the axial holes 132 of the lock collar 130 (and the second set of interior channels 34) flows out of radial holes 134 in the lock collar 132 by the rotation of the lock collar 130 into a cavity 136. The fluid that flows out of the radial holes 134 is a bulk solution having a reduced proportion of heavier phase fluid.

Figure 12:
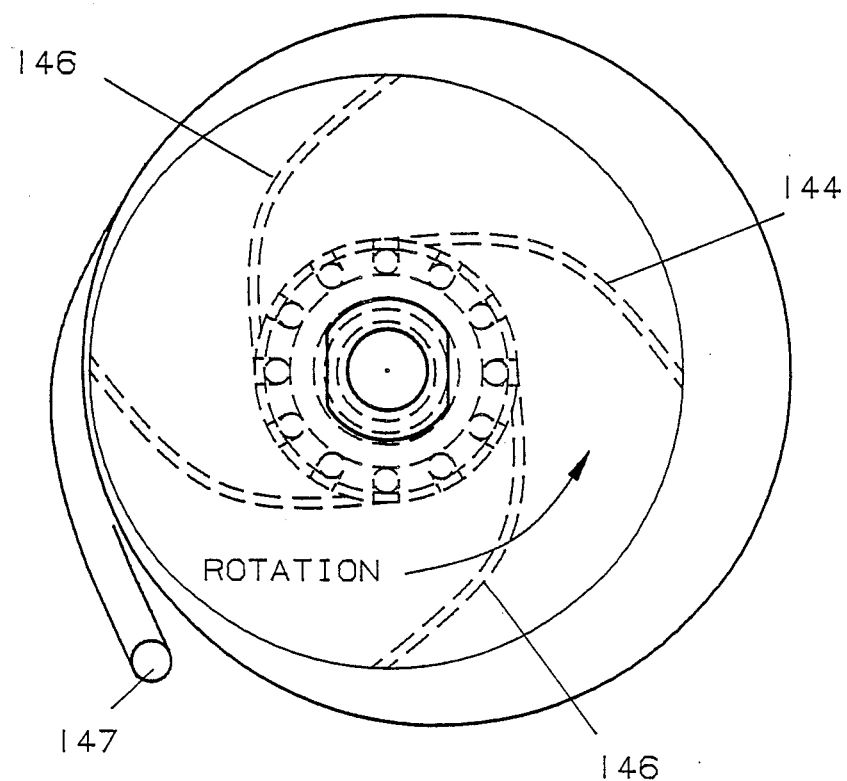
FIG. 12 is a top view of the centrifugal pump that is attached to the drive shaft of the present invention.
Figure 13:
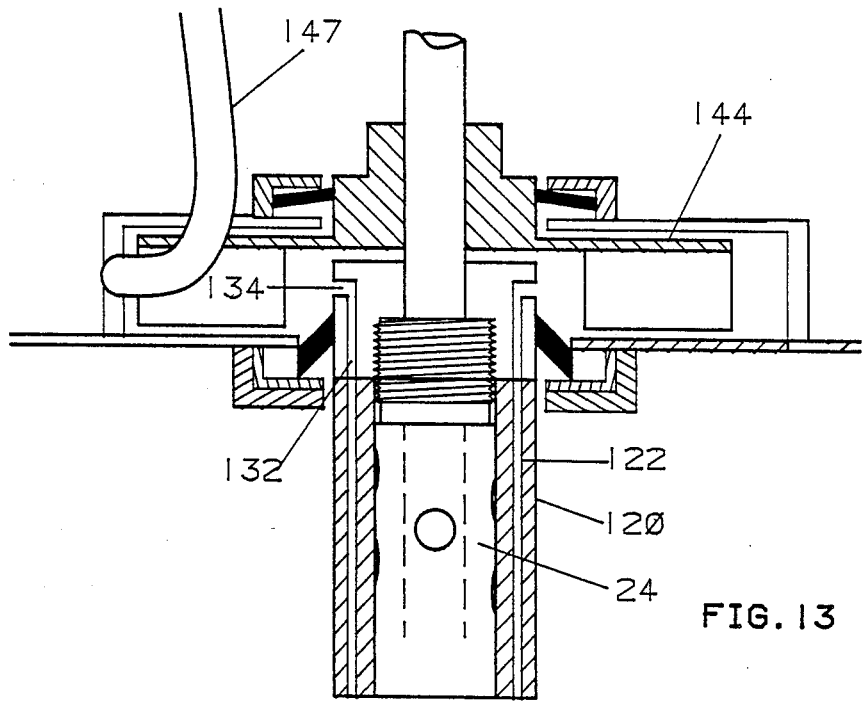
FIG. 13 is a cross-section of the centrifugal pump attached to the drive shaft.
Figure 14:
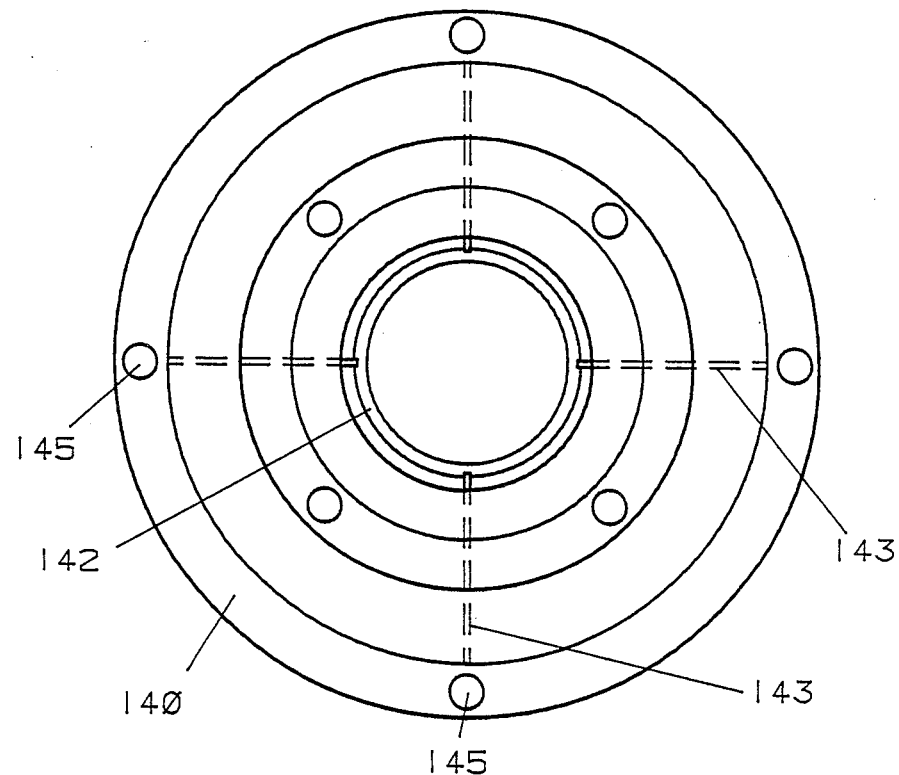
FIG. 14 is a vertical cross-section of the tapered section showing baffle shape and positions of the present invention.
Figure 15:
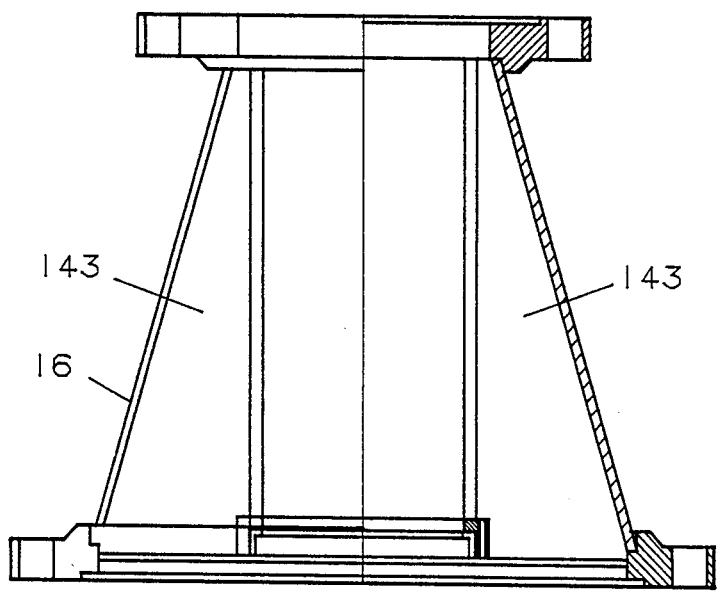
FIG. 15 is a horizontal cross-section of the tapered section taken along line 14—14 of FIG. 13 showing baffle shape end positions.

The cavity 136 is bounded by a horizontal baffle 140 (shown in FIG. 14) and a partition 142 that separates the cavity from the remainder of the tapered section 16. The baffle 140 has a concentric hole 142 through which the lock collar 130 extends, the sleeve 120 abutting against the bottom of the collar 130 and the lock collar 130 abutting against the top of a centrifugal pump 144. The baffle 140 also has four holes 145 so that the second chamber 21 is in fluid communication with the first chamber 19. The heavier fluid phase is thus allowed to migrate back to the first chamber 19. The centrifugal pump 144 is positioned about and driven by the shaft assembly 24. The pump 144 is shown in FIGS. 12 and 13. The centrifugal pump 144 includes vanes 146 that rotate in the direction as indicated in FIG. 12 to pull the lighter fluid phase through the axial holes 102, 122, and 132. The bulk solution having a higher proportion of lighter fluid phase is then slung into the second chamber 21 of the tapered section 16 through a pump outlet 147, where the solution is allowed to further coalescence, and the lighter phase exits the separator 10 at the oil outlet 36. As shown in FIGS. 14 and 15, coalescence is aided by baffles 143 that are positioned in a vertical and radial orientation to minimize turbulence in the second chamber 21 and to allow for more rapid coalescence. Media can also be used to fill the second chamber 21 of the tapered section 16 to provide additional surface area for the bulk solution to coalesce. The media can have various shapes and sizes but should promote upward/-downward flow of the separating phases without creating trapped pockets of either phase. The material used should be easily wetted by at least one of the phases but preferably the lighter phase.

A phase separation by coalescence is thus effected in the second chamber 21 of the tapered section 16. An interface is thus established between the heavier and lighter fluid phases within the second chamber 21. A float 148, represented by FIG. 16, is positioned near the top of the tapered section 16 at the outlet 36. The float 148 is designed to float upon water (or the heavier of the fluid phases) but not upon the oil (or the lighter of the two phases). The float 148 is attached to one end of a lever 150; the opposite end of the lever 150 is attached to a plug 152 that fits within the outlet 36. When enough of the lighter phase fluid has accumulated in the second chamber 21, the level of the heavier phase lowers as the heavier phase migrates back to the first chamber 19 by the holes 145 in the baffle 140. When the level of the heavier fluid phase lowers, the float 148 seeks the level of the heavier phase, the lever 150 pivots and the plug 152 moves away from the outlet 36 to allow the lighter phase to leave the separator 10.

As shown in FIG. 1 an accumulator 160 is connected downstream to the pipe 35 which allows the system to be backpulsed by activation of an air inlet 162. Such backpulsing acts to clean the disk 22 when the disks are partially clogged with particulate matter or blinded by the lighter phase so as to not allow permeation of the disks by the heavier phase.

To augment the separation capabilities of the apparatus 10, an air flotation method may be used in combination with the separator 10. As depicted in FIG. 17 but not visible in FIGS. 1 or 2, and aerated bulk solution is created at the entry pipe 33 to the separator 10. Air or gas carried by a pipe 164 is forced through a porous media 166 and enters into the bulk solution stream and enters the first chamber 19 at the pipe 33. Alternately, a stream of high pressure liquid with supersaturated dissolved air or gas may be injected into the bulk solution stream near the entry pipe 33 of the apparatus 10. The tiny bubbles formed by the effervescing dissolved air or gas form a large surface area on which the lighter phase, usually oil, may preferentially coalesce. The low density of the combination oil droplets/bubbles then migrate rapidly to the shaft assembly 24 for removal. The air flotation increases the flux rate of the disks 22 by a more rapid removal of the oil from the bulk solution. This may also permit higher oil concentrations in the feed stream carried by the pipe 33 while still maintaining reasonable flux rates.

The operation of the separator 10 of the present invention is as follows: a bulk solution comprising two immiscible fluid phases is introduced under pressure into the first chamber 19 at the entry pipe 33. The heavier phase is filtrated through the disks 22, the clarified fluid being transmitted through first radial holes 96 in the hubs 86, along a raceway created between the interior bore 92 of the hubs 86 and the circumferential outside edge 39 of the shaft 25, through apertures 46 in the shaft 25, down the first interior channel 30 to the exit port 32. The heavier phase is then transmitted through the lower seal assembly 20 to the exit pipe 35. A bulk solution having a reduced proportion of heavier phase is forced, under pressure, through second radial holes 106 in the hubs 86 and then up axial holes 102, 122, and 132 in the hubs 86, the sleeve 120 and the lock collar 130, respectively. Separation of the phases is further promoted in that the concave shape of the outer margin 90 of the hub 86 in the region of the second radial holes 106 promotes the flow of the lighter phase away from the discs 22. The bulk solution having a lower proportion of heavier phase is transmitted into the cavity 136, where the centrifugal pump 144 draws the lighter fluid phase through the axial holes 102, 122, and 132. The pump 144 then slings the fluid into the second chamber 21, where an interface is formed between the lighter fluid phase and the remaining heavier phase by coalescence. The heavier phase will migrate back to the first chamber 19 and the lighter phase leaves the system at the outlet 36.

An alternate embodiment of the above-described invention has no tapered section 16 and is utilized when a primary separator is being utilized ahead of the present invention, allowing a recycle of a partially concentrated oil stream rather than allowing a final coalescence to occur in the second chamber 21. This permits elimination of the tapered section 16 along with the centrifugal pump 144, which significantly decreases size and cost, as well as some possible maintenance. The pump 144 is eliminated because simple vessel pressure is utilized to remove the concentrated lighter phase from the first chamber 19 through a liquid feedback bias regulator or throttling valve. This concept may also permit the separator 10 to be mounted horizontal rather than vertical for special applications.

The flux rate of bulk solution through the separator 10 is determined primarily by the loading of the lighter phase upon the surface of the disks 22. The loading is a function of the following factors: concentration of the lighter in both the feed and the vessel, viscosity of the two phases, centrifugal force applied in the vessel, backpulse frequency and force, and disk surface characteristics.

The lighter phase has a tendency to temporarily partially blind the surface of the disk 22 to the flow of the filtered phase into the disk 22. As the lighter phase flows away from specific locations it reopens the surface to flow into the disk. The concentration of the lighter phase in the bulk solution ultimately determines the surface loading since much of the separation occurs at the boundary layer.

The viscosity of the lighter phase will affect how rapidly the film will flow across the surfaces of the disk 22. The viscosity of the heavier, filtrated phase will also have some effect based on the surface tension developed between the phases.

The rotational speed of rotation of the disks 22 has a direct relationship with the removal rate of the lighter phase from the surfaces of the disk 22. The removal rate of the lighter phase is related to the relative specific gravity of the two phases.

The frequency of backpulse, if utilized, will also affect the flux rate through two separate factors. First, the accumulation of any particulate in the pores will reduce flow, and thus backpulsing will discharge the particulate back into the bulk solution or into the reject phase. Secondly, the backpulse releases the lighter phase from the surface permitting faster movement either towards or away from the shaft depending upon the relative specific gravity.

The disk surface characteristics such as roughness, pore size, and contour may affect the flow characteristics of the lighter phase on the surface. The pore size and porosity will influence the rate of flow through the surfaces of the disk 22. The pore size and shape is influenced by the fact that the capillary pressure in the pores and the surface tension of the fluid in the interface prevents the entry of the lighter phase. If the pore diameter is too large for the capillary pressure exerted, the lighter phase breaks through the pore. If the pore diameter is too small, the flux rate through the pores becomes unacceptably low. If the pore (capillary) length is to short, the resistance to breakthrough of the lighter phase is unacceptably low. This means that a screen type surface is less acceptable for oil/water separation, as compared to solid/liquid separation, than a thicker honeycomb surface with the same micron rating.

It is understood that the invention is not confined to the particular construction and arrangement of parts herein illustrated and described, but embraces such modified forms thereof as come within the scope of the following claims.

What is claimed:

1. An apparatus for separation of multiple phases of liquids, comprising:
    (a) a housing having a first chamber and a second chamber, the second chamber being positioned above the first chamber, and the first chamber having an entry port for the introduction, under pressure, of a bulk solution having a heavier fluid phase and a lighter fluid phase;
    (b) a rotatable vertical shaft assembly located within the first chamber, the shaft assembly including a first interior channel and a second interior channel, and the shaft assembly further including a first set of openings in pre-selected regions along the length of the shaft assembly and a second set of openings in pre-selected regions along the length of the shaft assembly, the first set of openings being in fluid communication with the first interior channel and the second set of openings being in fluid communication with the second interior channel, the first interior channel being in fluid communication with an exit port and the second interior channel leading to the second chamber;
    (c) a plurality of stacked disks that are porous to the heavier fluid phase, the stacked disks being connected to the shaft assembly in the pre-selected regions of the first set of openings so that the heavier fluid phase will permeate the disks and flow through the first set of openings to the first interior channel and then to the exit port;
    (d) means for rotating the shaft at a sufficient speed to prevent accumulation of the lighter fluid phase on at least a substantial portion of the surfaces of the stacked disks; and
    (e) an outlet located in the second chamber through which the lighter fluid phase is output.

2. The apparatus of claim 1 wherein the outlet is located near the top of the second chamber.

3. The apparatus of claim 1 wherein the second chamber has a top and a bottom, and the second chamber is tapered such that the top is narrower than the bottom.

4. The apparatus of claim 1 wherein the housing has a baffle extending radially therefrom into the second chamber to minimize turbulence of the liquid entering into the second chamber from the second interior channel of the shaft.

5. The apparatus of claim 4 wherein the baffle has a vertical orientation.

6. The apparatus of claim 1 wherein media are used to fill the second chamber to provide additional surface area for the bulk solution to coalesce.

7. The apparatus of claim 1 further including a centrifugal pump located in the second chamber that draws fluid from the second interior channel into the second chamber.

8. The apparatus of claim 2 wherein fluid from the second interior channel coalesces within the second chamber.

9. The apparatus of claim 8 wherein there is a hole between the second chamber and the first chamber so that the heavier fluid phase is allowed to migrate back to the first chamber.

10. The apparatus of claim 9 further including a float sensitive to the level of the heavier phase fluid and a means connected to the float for opening and closing the outlet, the outlet being opened by the means for opening and closing as the level of the heavier fluid phase lowers, thus allowing the lighter fluid phase to exit the apparatus through the outlet.

11. The apparatus of claim 10 wherein the outlet is closed by the means for opening and closing as the level of the heavier fluid phase rises, thus preventing fluid from exiting the apparatus through the outlet.

12. The apparatus of claim 10 wherein the means for opening and closing includes a lever.

13. The apparatus of claim 1 wherein the disks are in spaced relation.

14. The apparatus of claim 14 wherein the second set of openings are between the disks.

15. The apparatus of claim 1 wherein the shaft assembly includes a shaft and a plurality of hubs in stacked relation, the shaft having a circumferential edge, an axial bore that forms the first interior channel, and apertures that lead from the circumferential edge to the axial bore to allow fluid communication therebetween, the hubs each having an outer margin and an interior bore, the hubs being positioned about the shaft such that the circumferential edge of the shaft fits within the interior bore of the hubs, each of the hubs having a radial hole leading from the outer margin of the hub to the interior bore of the hub to allow fluid communication therebetween, and wherein there is fluid communication between the radial holes of the hubs and the apertures of the shaft, the disks being attached to and covering the hubs in the region of the radial holes of the hub.

16. The apparatus of claim 15 wherein each of the hubs has a lip that extends inwardly from the interior bore, the lip abutting against the circumferential edge to create a gap between the interior bore of the hub and the circumferential edge of the shaft and provide a raceway that allows fluid communication between the radial holes of the hubs and the apertures of the shaft.

17. The apparatus of claim 1 wherein the shaft assembly includes a shaft and a plurality of hubs in stacked relation, the hubs each having an outer margin, an interior bore, and two sides, the hubs being positioned about the shaft such that the shaft fits within the interior bore of the hubs, each of the hubs having an axial hole located between the outer margin and the interior bore and the axial hole extending between the two sides to allow fluid communication therebetween, and each of the hubs having a radial hole leading from the outer margin to the axial hole to allow fluid communication therebetween, and wherein there is fluid communication between the axial holes of the different hubs to form the second interior channel.

18. The apparatus of claim 17 wherein each of the hubs has a circumferential notch in one of the sides that intersects with the axial hole, the circumferential notch providing a raceway that allows fluid communication between the axial holes of the different hubs.

19. The apparatus of claim 17 wherein the radial holes of the hubs are located between the disks.

20. The apparatus of claim 17 wherein the hubs are positioned between the disks to space the disks apart.

21. The apparatus of claim 19 wherein the outer margin of the hub is concave in shape in the region of the radial hole to promote the flow of the lighter fluid phase away from the surface of the disks.

22. The apparatus of claim 1 wherein the shaft assembly includes a shaft and a plurality of hubs in stacked relation, the shaft having a circumferential edge, an axial bore that forms the first interior channel, and apertures that lead from the circumferential edge to the axial bore to allow fluid communication therebetween, the hubs each having an outer margin, an interior bore, and two sides, the hubs being positioned about the shaft such that the circumferential edge of the shaft fits within the interior bore of the hubs, each of the hubs having a first radial hole leading from the outer margin of the hub to the interior bore of the hub to allow fluid communication therebetween, and wherein there is fluid communication between the first radial holes of the hubs and the apertures of the shaft, the disks being attached to and covering the hubs in the region of the first radial holes of the hub, and each of the hubs further having an axial hole located between the outer margin and the interior bore and the axial hole extending between the two sides to allow fluid communication therebetween, and each of the hubs having a second radial hole leading from the outer margin to the axial hole to allow fluid communication therebetween, and wherein there is fluid communication between the axial holes of the different hubs to form the second interior channel.

23. The apparatus of claim 22 wherein each of the hubs has a lip that extends inwardly from the interior bore, the lip abutting against the circumferential edge to create a gap between the interior bore of the hub and the circumferential edge of the shaft and provide a raceway that allows fluid communication between the first radial holes of the hubs and the apertures of the shaft.

24. The apparatus of claim 22 wherein each of the hubs has a circumferential notch in one of the sides that intersects with the axial hole, the circumferential notch providing a raceway that allows fluid communication between the axial holes of the different hubs.

25. The apparatus of claim 22 wherein the second radial holes of the hubs are located between the disks.

26. The apparatus of claim 22 wherein the hubs are sized so as to space the disks apart.

27. The apparatus of claim 25 wherein the outer margin of the hub is concave in shape in the region of the second radial hole to promote the flow of the lighter fluid phase away from the disks.

28. The apparatus of claim 1 wherein dissolved gas is introduced to the bulk solution at the entry port.

29. The apparatus of claim 1 further including a means for backpulsing the filtrated heavier phase through the disks, the means for backpulsing located downstream of the exit port.

30. The apparatus of claim 29 wherein the means for backpulsing includes an accumulator.

31. An apparatus for separation of multiple phases of liquids, comprising:
 (a) a housing having a chamber, the chamber having an entry port for the introduction, under pressure, of a bulk solution having a heavier fluid phase and a lighter fluid phase;
 (b) a rotatable vertical shaft assembly located within the chamber, the shaft assembly including a first interior channel and a second interior channel, and the shaft assembly further including a first set of openings in pre-selected regions along the length of the shaft and a second set of openings in pre-selected regions along the length of the shaft assembly, the first set of openings being in fluid communication with the first interior channel and the second set of openings being in fluid communication with the second interior channel, the first interior channel being in fluid communication with an exit port and the second interior channel leading to an outlet through which the lighter fluid phase is output;
 (c) a plurality of stacked disks that are porous to the heavier fluid phase, the stacked disks being connected to the shaft assembly in the pre-selected regions of the first set of openings so that the heavier fluid phase will permeate the disks and flow through the first set of openings to the first interior channel and then to the exit port; and
 (d) means for rotating the shaft at a sufficient speed to prevent accumulation of the lighter fluid phase on at least a substantial portion of the surfaces of the stacked disks.

32. The apparatus of claim 31 wherein the disks are in spaced relation.

33. The apparatus of claim 32 wherein the second set of openings are between the disks.

34. The apparatus of claim 31 wherein the shaft assembly includes a shaft and a plurality of hubs in stacked relation, the shaft having a circumferential edge, an axial bore that forms the first interior channel, and apertures that lead from the circumferential edge to the axial bore to allow fluid communication therebetween, the hubs each having an outer margin and an interior bore, the hubs being positioned about the shaft such that the circumferential edge of the shaft fits within the interior bore of the hubs, each of the hubs having a radial hole leading from the outer margin of the hub to the interior bore of the hub to allow fluid communication therebetween, and wherein there is fluid communication between the radial holes of the hubs and the apertures of the shaft, the disks being attached to and covering the hubs in the region of the radial holes of the hub.

35. The apparatus of claim 34 wherein each of the hubs has a lip that extends inwardly from the interior bore, the lip abutting against the circumferential edge to create a gap between the interior bore of the hub and the circumferential edge of the shaft and provide a raceway that allows fluid communication between the radial holes of the hubs and the apertures of the shaft.

36. The apparatus of claim 31 wherein the shaft assembly includes a shaft and a plurality of hubs in stacked relation, the hubs each having an outer margin, an interior bore, and two sides, the hubs being positioned about the shaft such that the shaft fits within the interior bore of the hubs, each of the hubs having an axial hole located between the outer margin and the interior bore and the axial hole extending between the two sides to allow fluid communication therebetween, and each of the hubs having a radial hole leading from the outer margin to the axial hole to allow fluid communication therebetween, and wherein there is fluid communication between the axial holes of the different hubs to form the second interior channel.

37. The apparatus of claim 36 wherein each of the hubs has a circumferential notch in one of the sides that intersects with the axial hole, the circumferential notch providing a raceway that allows fluid communication between the axial holes of the different hubs.

38. The apparatus of claim 36 wherein the radial holes of the hubs are located between the disks.

39. The apparatus of claim 36 wherein the hubs are positioned between the disks to space the disks apart.

40. The apparatus of claim 38 wherein the outer margin of the hub is concave in shape in the region of the radial hole to promote the flow of the lighter fluid phase away from the surface of the disks.

41. The apparatus of claim 31 wherein the shaft assembly includes a shaft and a plurality of hubs in stacked relation, the shaft having a circumferential edge, an axial bore that forms the first interior channel, and apertures that lead from the circumferential edge to the axial bore to allow fluid communication therebetween, the hubs each having an outer margin, an interior bore, and two sides, the hubs being positioned about the shaft such that the circumferential edge of the shaft fits within the interior bore of the hubs, each of the hubs having a first radial hole leading from the outer margin of the hub to the interior bore of the hub to allow fluid communication therebetween, and wherein there is fluid communication between the first radial holes of the hubs and the apertures of the shaft, the disks being attached to and covering the hubs in the region of the first radial holes of the hub, and each of the hubs further having an axial hole located between the outer margin and the interior bore and the axial hole extending between the two sides to allow fluid communication therebetween, and each of the hubs having a second radial hole leading from the outer margin to the axial hole to allow fluid communication therebetween, and wherein there is fluid communication between the axial holes of the different hubs to form the second interior channel.

42. The apparatus of claim 41 wherein each of the hubs has a lip that extends inwardly from the interior bore, the lip abutting against the circumferential edge to create a gap between the interior bore of the hub and the circumferential edge of the shaft and provide a raceway that allows fluid communication between the first radial holes of the hubs and the apertures of the shaft.

43. The apparatus of claim 41 wherein each of the hubs has a circumferential notch in one of the sides that intersects with the axial hole, the circumferential notch providing a raceway that allows fluid communication between the axial holes of the different hubs.

44. The apparatus of claim 41 wherein the second radial holes of the hubs are located between the disks.

45. The apparatus of claim 41 wherein the hubs are sized so as to space the disks apart.

46. The apparatus of claim 44 wherein the outer margin of the hub is concave in shape in the region of the second radial hole to promote the flow of the lighter fluid phase away from the disks.

47. The apparatus of claim 31 wherein dissolved gas is introduced to the bulk solution at the entry port.

48. The apparatus of claim 31 further including a means for backpulsing the filtrated heavier phase through the disks, the means for backpulsing located downstream of the exit port.

49. The apparatus of claim 48 wherein the means for backpulsing includes an accumulator.

50. A hub for use in an apparatus that separates multiple phases of liquids, the apparatus including a rotatable vertical shaft mounted within a chamber, the shaft having a circumferential edge, an axial bore, and apertures that lead from the circumferential edge to the axial bore to allow fluid communication therebetween, and the apparatus further including stacked disks that are mounted about the shaft, the hub comprising an outer margin and an interior bore, the hub being positioned about the shaft such that the circumferential edge of the shaft fits within the interior bore of the hub, the hub having a radial hole leading from the outer margin of the hub to the interior bore of the hub to allow fluid communication of one of the liquid phases therebetween, and wherein there is fluid communication of said liquid phase between the radial holes of the hubs and the apertures of the shaft, the disks being attached to and covering the hubs in the region of the radial holes of the hub.

51. A hub for use in an apparatus that separates multiple phases of fluids, the apparatus including a rotatable vertical shaft mounted within a chamber, and the apparatus further including stacked disks that are mounted about the shaft, the hub comprising an outer margin, an interior bore, and two sides, the hub being capable of being positioned about the shaft such that the shaft fits within the interior bore of the hub, the hub having an axial hole located between the outer margin and the interior bore and the axial hole extending between the two sides to allow fluid communication of one of the liquid phases therebetween, and the hub having a radial hole leading from the outer margin to the axial hole to allow fluid communication of said liquid phase therebetween.

* * * * *